(12) United States Patent
Briggs et al.

(10) Patent No.: US 9,513,120 B2
(45) Date of Patent: Dec. 6, 2016

(54) WORKFLOW IMPROVEMENTS FOR STAKEOUT

(71) Applicant: Trimble Navigation Limited, Sunnyvale, CA (US)

(72) Inventors: Graham Briggs, Corvallis, OR (US); Christian Graesser, Vallentuna (SE); James M. Janky, Los Altos, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 325 days.

(21) Appl. No.: 13/794,012

(22) Filed: Mar. 11, 2013

(65) Prior Publication Data

US 2014/0081571 A1 Mar. 20, 2014

Related U.S. Application Data

(60) Provisional application No. 61/703,274, filed on Sep. 20, 2012.

(51) Int. Cl.
*G01C 15/00* (2006.01)
*G01C 15/06* (2006.01)
*G01C 1/04* (2006.01)

(52) U.S. Cl.
CPC ............... *G01C 15/00* (2013.01); *G01C 15/06* (2013.01); *G01C 1/04* (2013.01)

(58) Field of Classification Search
USPC ....................................................... 701/491
See application file for complete search history.

(56) References Cited

U.S. PATENT DOCUMENTS 5,255,441 A 10/1993 Burgess et al.
5,739,785 A 4/1998 Allison et al.
(Continued)

FOREIGN PATENT DOCUMENTS

EP 2 431 708 A1 3/2012
EP 2431708 A1 * 3/2012
(Continued)

OTHER PUBLICATIONS

International Search Report and Written Opinion for PCT Application No. PCT/US2013/060202, mailed Dec. 20, 2013, 12 pages.
(Continued)

*Primary Examiner* — Jean-Paul Cass
(74) *Attorney, Agent, or Firm* — Kilpatrick Townsend & Stockton LLP

(57) ABSTRACT

A navigational apparatus includes a visual display, first and second imaging devices, and one or more processors. The first imaging device has an optical axis extending in a first direction and is configured to obtain first image data. The second imaging device has an optical axis extending in a second direction substantially perpendicular to the first direction and is configured to obtain second image data. When the visual display is displaying first image data, the one or more processors are configured to superimpose a first navigational graphic on the visual display overlaid on a portion of the first image data associated with the point of interest. When the visual display is displaying second image data, the one or more processors are configured to superimpose a second navigational graphic on the visual display overlaid on a portion of the second image data associated with the point of interest.

17 Claims, 17 Drawing Sheets

(56) References Cited

U.S. PATENT DOCUMENTS

| | | | |
|---|---|---|---|
| 5,903,235 A | 5/1999 | Nichols | |
| 5,977,908 A | 11/1999 | Nichols | |
| 6,052,083 A | 4/2000 | Wilson | |
| 6,067,046 A | 5/2000 | Nichols | |
| 6,094,625 A | 7/2000 | Ralston | |
| 6,140,957 A | 10/2000 | Wilson et al. | |
| 6,330,503 B1 | 12/2001 | Sharp et al. | |
| 6,480,148 B1 | 11/2002 | Wilson et al. | |
| 6,657,734 B1 | 12/2003 | Monz et al. | |
| 6,688,012 B1 | 2/2004 | Crain et al. | |
| 7,669,341 B1 | 3/2010 | Carazo | |
| 7,978,128 B2* | 7/2011 | Scherzinger | G01C 15/00 342/357.23 |
| 8,284,254 B2* | 10/2012 | Romanowich | G08B 13/19608 348/143 |
| 8,427,632 B1 | 4/2013 | Nash et al. | |
| 8,508,595 B2* | 8/2013 | An | H04N 5/2628 348/143 |
| 8,634,595 B2* | 1/2014 | Song | G06T 7/0042 382/107 |
| 8,769,838 B2 | 7/2014 | Ward | |
| 8,934,017 B2* | 1/2015 | Chen | H04N 7/181 348/159 |
| 9,182,229 B2* | 11/2015 | Grasser | G01C 15/00 |
| 9,222,771 B2* | 12/2015 | Rosengaus | G01C 15/002 |
| 9,235,763 B2* | 1/2016 | Joyce | G01C 11/04 |
| 9,247,239 B2* | 1/2016 | He | G01C 11/06 |
| 2006/0170785 A1* | 8/2006 | Mashitani | H04N 7/142 348/211.99 |
| 2007/0104353 A1* | 5/2007 | Vogel | G01C 1/04 382/106 |
| 2009/0110019 A1* | 4/2009 | Houde-Walter | F41G 3/145 372/55 |
| 2009/0138233 A1* | 5/2009 | Kludas | G01C 15/00 702/158 |
| 2009/0224153 A1* | 9/2009 | Houde-Walter | B82Y 20/00 250/330 |
| 2010/0253931 A1* | 10/2010 | Meier | G01B 11/002 356/4.01 |
| 2011/0066375 A1* | 3/2011 | France | G01C 15/00 701/469 |
| 2012/0010847 A1 | 1/2012 | Hamel et al. | |
| 2012/0182417 A1* | 7/2012 | Everett | F41G 1/30 348/135 |
| 2013/0162469 A1* | 6/2013 | Zogg | G01C 15/002 342/357.25 |
| 2014/0247439 A1* | 9/2014 | Neier | G01C 15/002 356/4.01 |

FOREIGN PATENT DOCUMENTS

| | | |
|---|---|---|
| EP | 2 458 405 A1 | 5/2012 |
| EP | 2 573 513 A1 | 3/2013 |
| WO | WO 2012037139 A2 * | 3/2012 |

OTHER PUBLICATIONS

International Preliminary Report on Patentability mailed Apr. 2, 2015 for PCT/US2013/060202, 9 pages.

* cited by examiner

Crosshairs at $P_0$ indicate current device location.
Circle at $P_1$ represents point of interest.

Side View of Integrated Receiver & Imaging Device

Top View of Precision Adjustment System

WORKFLOW IMPROVEMENTS FOR STAKEOUT

CROSS-REFERENCE TO RELATED APPLICATIONS

This application claims priority to U.S. Provisional Patent Application No. 61/703,274, filed Sep. 20, 2012, the entire contents of which are incorporated herein by reference in their entirety for all purposes.

FIELD OF INVENTION

The present invention relates broadly to navigating to and accurately identifying points having known coordinates using positioning information. Disclosed apparatuses and methods may be used, for example, to provide improved workflows for surveying stakeout applications.

BACKGROUND

FIG. 1 illustrates a method of navigating to a known location as may be performed during a typical surveying stakeout application. A user 140 navigates toward a point of interest 152 by inputting the location (e.g., in latitude and longitude or another coordinate system) into a handheld device 100 and then following on screen directions such as an indication of a direction and distance from a current position. The on screen directions are useful while the user 140 is approaching the point of interest 152 from a distance. However, the on screen directions may change wildly when the user 140 is very close to the point of interest 152. Therefore, once the user 140 is within a few meters, the user's pace must be slowed to assure that the point of interest 152 is not passed over. When the user 140 has identified an estimated location 150 that is believed to be the point of interest 152, the process of confirming the estimated location 150 begins. This iterative process typically involves placing a surveying pole 110 (e.g., a range pole or rover) over the estimated location 150, leveling the surveying pole 110 using a leveling device 130 (e.g., a bubble level), acquiring a position measurement (e.g., using signals received via an antenna 120), and adjusting the placement of the surveying pole 110 as necessary. The iterative process continues until the acquired position measurement is within some acceptable distance from the point of interest 152. Similar steps may be followed using other navigational or survey equipment such as a total station and prism pole.

In the example depicted in FIG. 1, the user 140 initially estimates the desired location 152 to be at location 150 at time $t_1$. After acquiring a position measurement, the user 140 adjusts the placement of the surveying pole 110 to location 151 at time $t_2$. Upon acquiring a second position measurement, the user 140 adjusts the placement of the surveying pole 110 to location 152 at time $t_3$. At this point, the position measurement matches (or is within an acceptable distance from) the desired location 152.

In light of the foregoing example, it would be advantageous to eliminate or simplify the iterative and time consuming process of receiving a position measurement and adjusting the placement of the surveying pole until the desired location is found.

SUMMARY

Some embodiments of the present invention may be used to provide improved workflows for stakeout processes used by surveyors to locate and mark a point of interest (often on the ground). In accordance with an embodiment of the invention, a method for identifying a point of interest having known coordinates in a reference frame includes providing a location determination system, providing an observation system for relating a location as determined by the location system to a desired point, and providing a transfer mechanism for relating an indicated position of the location determination system to the desired point.

In accordance with another embodiment of the invention, a method for navigating to and identifying a point of interest includes a first means for navigating to within a vicinity of the point of interest, and a second means for identifying the point of interest, wherein the first means is different from the second means.

In accordance with another embodiment of the invention, a method for navigating to and identifying a point of interest using a survey instrument includes navigating to within a vicinity of the point of interest using image data obtained from a forward looking camera and graphics overlaid on the image data. At least one graphic indicates a current position of the survey instrument and at least one graphic indicates a location of the point of interest. The method also includes identifying the point of interest using image data obtained from the downward looking camera and a transfer mechanism for identifying the point of interest.

In accordance with another embodiment of the invention, an apparatus configured to assist a user in navigating to and identifying a point of interest at a known position in a reference frame includes a visual display configured to display image data, and a first imaging device configured to obtain first image data. The first imaging device has an optical axis extending in a first direction. The apparatus also includes a second imaging device configured to obtain second image data. The second imaging device has an optical axis extending in a second direction substantially perpendicular to the first direction. The first imaging device and the second imaging device are arranged such that when the apparatus is at a first position the point of interest is within a field of view of the first imaging device and outside a field of view of the second imaging device, and when the apparatus is at a second position the point of interest is outside the field of view of the first imaging device and within the field of view of the second imaging device. The apparatus also includes one or more processors configured to determine first image coordinates of the first image data associated with a location of the point of interest, and when the visual display is displaying the first image data, to superimpose a first navigational graphic on the visual display overlaid on the first image coordinates. The one or more processors are also configured to determine second image coordinates of the second image data associated with the location of the point of interest, and when the visual display is displaying the second image data, to superimpose a second navigational graphic on the visual display overlaid on the second image coordinates.

In an embodiment, the apparatus also includes a receiver configured to determine a position of the apparatus. The one or more processors are further configured to superimpose a navigational graphic on the visual display overlaid on the position of the apparatus.

In another embodiment, the apparatus also includes a laser pointer system configured to provide a laser mark on the second position, the laser mark visible when the visual display is displaying the second image data.

In another embodiment, the first imaging device and the second imaging device are coupled to a surveying pole.

In another embodiment, the first imaging device and the second imaging device are integrated within a handheld data collector.

In another embodiment, the first imaging device and the second imaging device are integrated with a prism pole.

In another embodiment, the first imaging device and the second imaging device are disposed within a housing of a global navigation satellite system (GNSS) receiver, and the housing of the GNSS receiver is coupled to a surveying pole.

In yet another embodiment, the first imaging device and the second imaging device are coupled to a surveying pole, and the visual display is disposed on a handheld data collector.

In accordance with yet another embodiment of the invention, a method for providing navigational information to a user, where the navigational information can be used by the user to navigate to and identify a point of interest, includes performing a coarse position guidance procedure. The coarse position guidance procedure includes using a first imaging device having an optical axis that points outward in a substantially horizontal direction to obtain first image data. The point of interest is within a field of view of the first imaging device at a first position, and the point of interest is outside the field of view of the first imaging device at a second position. The second position is closer to the point of interest than the first position. Performing the coarse position guidance also includes providing the first image data on a visual display and providing a first navigational graphic on the visual display. The first navigational graphic is overlaid on a portion of the first image data associated with the point of interest. The method also includes performing a fine position guidance procedure that includes using a second imaging device having an optical axis that points downward in a substantially vertical direction to obtain second image data. The point of interest is outside a field of view of the second imaging device at the first position, and the point of interest is within the field of view of second first imaging device at the second position. Performing the fine position guidance also includes providing the second image data on the visual display and providing the first navigational graphic on the visual display. The first navigational graphic is overlaid on a portion of the second image data associated with the point of interest.

In an embodiment, the method also includes determining a location of the first position and determining a location of the second position. The location of the first position and the location of the second position are determined using a total station with a prism pole.

In another embodiment, the method also includes determining a location of the first position and determining a location of the second position. The location of the first position and the location of the second position are determined using a global navigation satellite system (GNSS) receiver.

In another embodiment, the visual display is disposed on a handheld data collector.

In another embodiment, performing the fine position guidance procedure also includes providing a second navigational graphic on the visual display, where the second navigational graphic is overlaid on a portion of the second image data associated with the second position.

In another embodiment, performing the fine position guidance procedure further comprises providing a laser mark on the second position.

In another embodiment, the first imaging device and the second imaging device are each coupled to a surveying pole having a contact point configured to be placed on the ground. The second imaging device is coupled to the surveying pole at a position that is closer to the contact point than the first imaging device.

In another embodiment, performing the fine position guidance procedure includes adjusting an X-Y position of the second imaging device using a precision adjustment system.

These and other embodiments are described further below with reference to the drawings.

DETAILED DESCRIPTION

Some embodiments of the present invention can be used to simplify the process of navigating to and accurately identifying points of interest. These points may have known coordinates but are often difficult to identify with sufficient accuracy for applications such as surveying. In an embodiment, an augmented reality (AR) system may be used to navigate to and identify a point of interest by overlaying graphics representing a current location and the point of interest on an image display. The graphics may be overlaid on real-time image data depicting the surrounding environment. This can simplify navigation to the point of interest. In another embodiment, an AR system may be used to navigate to within a certain distance of a point of interest, afterwhich a transfer mechanism (e.g., a laser pointer) may be used to accurately identify a location of the point of interest.

Some embodiments of the present invention may be used, for example, to improve workflows for stakeout processes used by surveyors to locate and mark points of interest. These points of interest are often positions on the ground but can be on any other object or located virtually anywhere. These points may have known coordinates in a reference frame such as latitude-longitude-altitude or a global navigation satellite system (GNSS) coordinate system such as the World Geodetic System (e.g., WGS-84).

Figure 2:
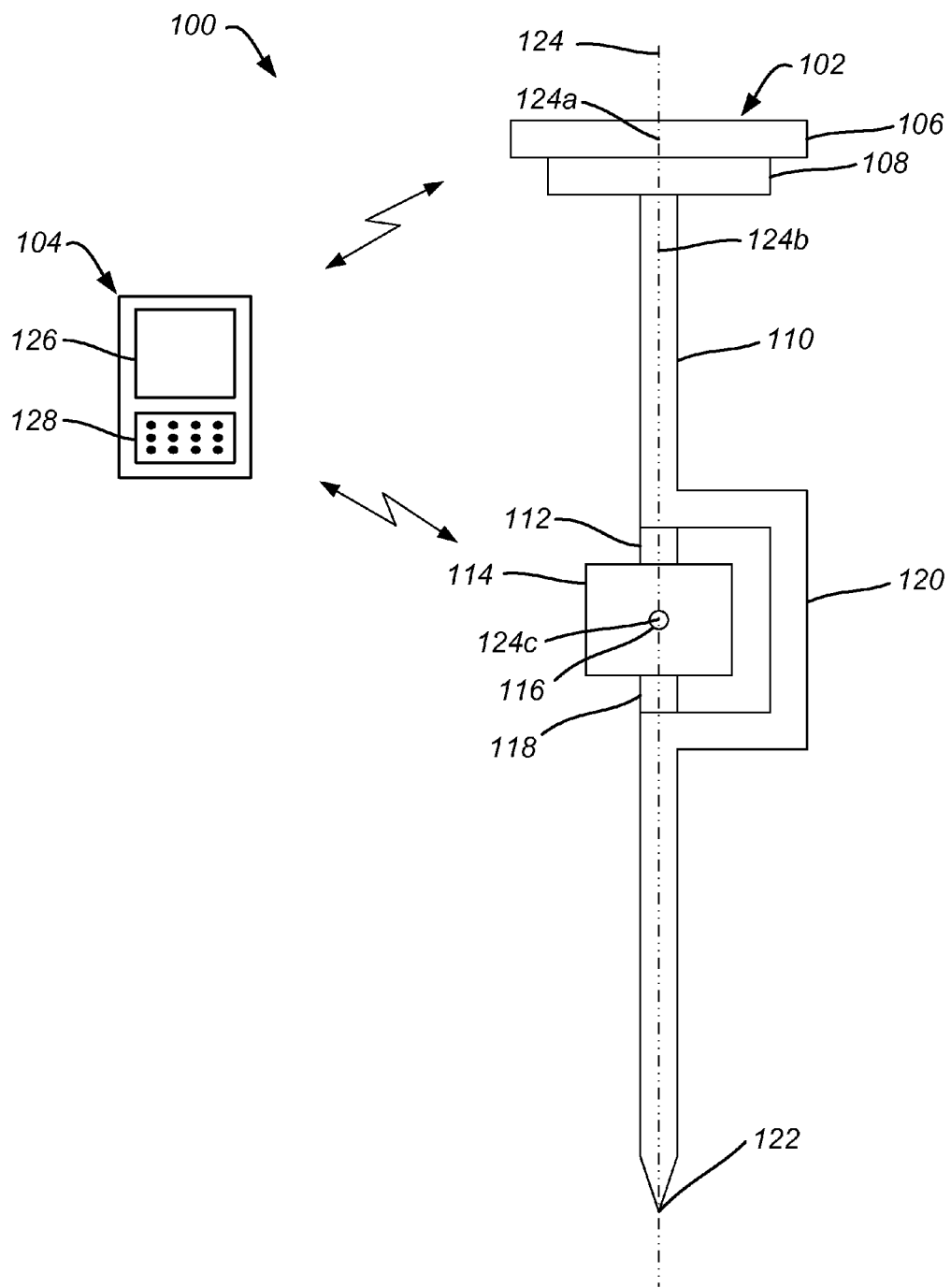
FIG. 2 is a simplified diagram of an apparatus for providing navigational information associated with points of interest in accordance with an embodiment of the invention.

FIG. 2 is a simplified diagram of an apparatus 100 for providing navigational information associated with points of interest in accordance with an embodiment of the invention. The navigational information can be used to navigate to and identify a point of interest having known coordinates in a reference frame. The apparatus 100 includes a surveying pole 102 and a control device 104. In the exemplary embodiment illustrated in FIG. 2, the surveying pole 102 includes an antenna 106, a receiver 108, and an imaging device 114. In this example, the antenna 106 and the receiver 108 are mounted to an upper section 110 of the surveying pole 102, and the imaging device 114 is mounted to a middle section 120 of the surveying pole 102. It is to be understood that FIG. 2 is provided merely as an example, however, and other arrangements are included within the scope of embodiments of the present invention.

The antenna 106 may be a satellite or telemetry antenna configured to receive signals used to determine position information. In an embodiment the antenna 106 is a GNSS antenna configured to receive signals from satellites. The antenna 106 receives the signals and passes data to the receiver 108 for processing.

The receiver 108 may be configured to receive data from the antenna 106 and process the data to determine position information. The receiver 108 typically includes a processor, a memory, and a clock, and is configured to determine position information in accordance with known techniques. In an embodiment the receiver 108 is a GNSS receiver configured to determine position information. As an example, the receiver 108 may be configured to determine a position of a phase center 124a of the antenna 106. The phase center 124a of the antenna 106 and a vertical axis 124b of the surveying pole 102 are typically aligned along axis 124. Contact point 122 may also be aligned along the axis 124. Some embodiments also include one or more tilt sensors used to determine an angle and orientation of the axis 124 relative to a local gravity vector. The tilt sensor may include a bubble level, an accelerometer, one or more gyros, a plumb bob, a tilt meter, and/or the like. The location of a point on the ground may be determined by placing the contact point 122 on the point, determining a position of the phase center 124a of the antenna 106 and a tilt and orientation of the surveying pole 102, and accounting for the offset between the contact point 122 and the position of the phase center 124a in accordance with known techniques. The receiver 108 may be configured to send the position information to the control device 104. The receiver 108 and the control device 104 may be coupled via wired or wireless connections.

In some embodiments the position of the surveying pole 102 may be determined using an optical/electronic total station. For example, the surveying pole 102 may include a prism that enables the position of the surveying pole 102 to be tracked. The prism may be in place of, or in addition to, the receiver 108 and the antenna 106. These embodiments allow position information to be obtained in areas or locations where GNSS signal reception is poor or unavailable.

The receiver 108 may also include an orientation device configured to determine an orientation of the surveying pole 102 about a vertical axis defined by the local gravity vector. Alternatively, the orientation device may be separate from the receiver 108 and may be, for example, coupled to the surveying pole 102 or integrated with the imaging device 114. In an embodiment, the orientation device is a compass, magnetometer with one or more gyros, or the like and is configured to provide orientation information to the control device 104. The orientation device may be coupled with the control device 104 via wired or wireless connections. In other embodiments, the orientation device may comprise a software based system configured to determine orientation information, such as a heading, based on position information received from the receiver 108. For example, the orientation information may be determined based on movement of the surveying pole 102 in accordance with known techniques. Such an orientation device may be integrated with the receiver 108 or with the control device 104.

The surveying pole 102 also includes an imaging device 114. The imaging device 114 may be a digital camera configured to acquire image data. For example, in an embodiment the imaging device 114 is a digital video camera that uses solid-state CCD or CMOS image sensors to capture image data. The imaging device 114 may be coupled to the surveying pole 102 using upper and lower mounts 112 and 118 as shown in the exemplary embodiment illustrated in FIG. 1. The imaging device 114 may include a visual display configured to display the image data. The imaging device 114 may also be coupled with the control device 104 and be configured to send the image data to the control device 104 for display on visual display 126. The imaging device 114 and the control device 104 may be coupled via wired or wireless connections.

In an embodiment the position, orientation, and/or tilt of an optical center 124c of the imaging device 114 may be determined based on a position of the phase center 124a of the antenna 106, a tilt and orientation of the surveying pole 102, and an offset between the optical center 124c and the phase center 124a in accordance with known techniques.

In an embodiment, upper and lower mounts 112 and 118 may be configured to allow the imaging device 114 to rotate about a horizontal axis. Rotation about the horizontal axis changes the pitch, and thus the field of view, of the imaging device 114. Alternatively, the lens of the imaging device may swivel and thus allow for changes in the field of view of the imaging device 114. In either configuration, a tilt sensor or fixed scales may be used to determine an angle of rotation about the vertical axis 124 and/or a horizontal axis. The angle of rotation of the imaging device 114 may be changed to view objects or points that are near the contact point 122.

The apparatus 100 shown in FIG. 2 also includes a control device 104. In some embodiments the control device 104 may be integrated with the imaging device 114. The exemplary control device 104 shown in FIG. 1 includes a visual display 126 and an input device 128. The visual display 126 may be configured to display the image data. The input device 128 may include a keyboard, touchscreen, touchpad, and/or the like and be configured to enable data input or retrieval. The control device 104 typically includes a processor and memory and may be configured to receive position information from the receiver 108, image data from the imaging device 114, and orientation information from the orientation device.

Additionally, the control device 104 may store and access object information in local memory or a remote database. In an embodiment the object information may include GNSS coordinates of objects (or points of interest). The GNSS coordinates may be entered by the operator or selected from previously performed measurements using the input device 128. The object information may also comprise a digital model of the surrounding environment. The digital model may comprise locations of points measured, for example, using an optical/electronic total station. The digital model may be used to select the objects or points of interest.

As an example, in an embodiment the operator may select a mode that displays the digital model in a plan view (e.g., map view) on the visual display 126. The operator may select an object or point of interest using, for example, a cursor or touchscreen. The operator may then select a mode that displays the image data. The image data may include a view of the local environment. As explained more fully below, a navigational graphic may be superimposed on the image data to provide navigational information associated with a location of the object or point of interest relative to a position of the apparatus 100. The object information may include attribute data associated with the object or point of interest. For example, the attribute data may include information or notes prepared beforehand or added by the operator during the current work.

The control device 104 may also include a software or hardware based rendering system configured to determine image coordinates associated with the location of the object or point of interest. For example, the rendering system may be configured to determine the image coordinates (or one of more pixels) of the image data that correspond to the object or point of interest. The image coordinates may define a two-dimensional plane that includes points within the field of view of the imaging device 114 as well as points that are outside the field of view of the imaging device 114.

For points within the field of view of the imaging device 114, the rendering system may be configured to determine the portion of the image data (e.g., one or more pixels) associated with the object or point of interest. The rendering system may superimpose one or more navigational graphics on the visual display 126 that are overlaid on the portion of the image data (or the image coordinates) associated with the object or point of interest. For example, a navigational graphic in the form of a dot, star, cross, or the like may be superimposed on the portion of the image data associated with the location of the object or point of interest.

For points outside the field of view of the imaging device, the rendering system may be configured to determine the image coordinates associated with the object or point of interest. The rendering system may superimpose one or more navigational graphics on the visual display 126 oriented relative to the image coordinates associated with the location of the object or point of interest. For example, a navigational graphic in the form of an arrow may be superimposed on the image data extending towards the image coordinates. In this case the navigational graphic may indicate a direction to move the imaging device to bring the object or point within the field of view.

In an embodiment the image coordinates associated with the location of the object may be determined by a series of linear transforms as described in U.S. Patent Publication No. 2011/0066375, filed Sep. 11, 2009, the entire contents of which are incorporated herein by reference in their entirety.

Figure 1:
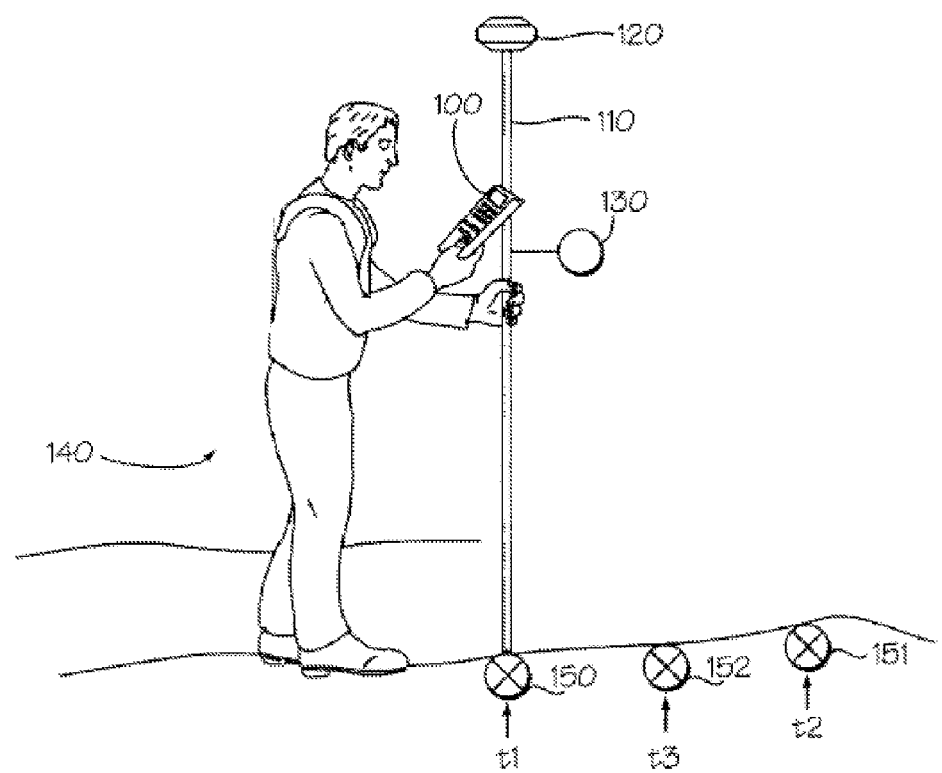
FIG. 1 is simplified diagram that illustrates a method of navigating to a known location as may be performed during a typical surveying stakeout application.

While the embodiment described with regard to FIG. 1 may be useful for navigating to within a general vicinity of a point of interest (e.g., to within a few meters or less), it may not be able to identify points with sufficient accuracy for some applications. For example, as a distance between the apparatus 100 and a point of interest decreases, the point of interest may leave a field of view of the imaging device 114, particularly when the imaging device is above the point of interest. Some of the other embodiments provide increased accuracy when identifying points of interest in these and other situations.

Imaging Device Integrated with a Data Collector

In some embodiments an imaging device may be integrated with a data collector (e.g., handheld control device). For example, a lens of an imaging device may be located on an edge or side of a data collector, and an associated image sensor may be located within the data collector. The data collector may include one or more of a position measuring device, an orientation device, tilt sensors, processors, and memory. Using such a device, a user can navigate to and accurately identify a point of interest.

Figure 3:
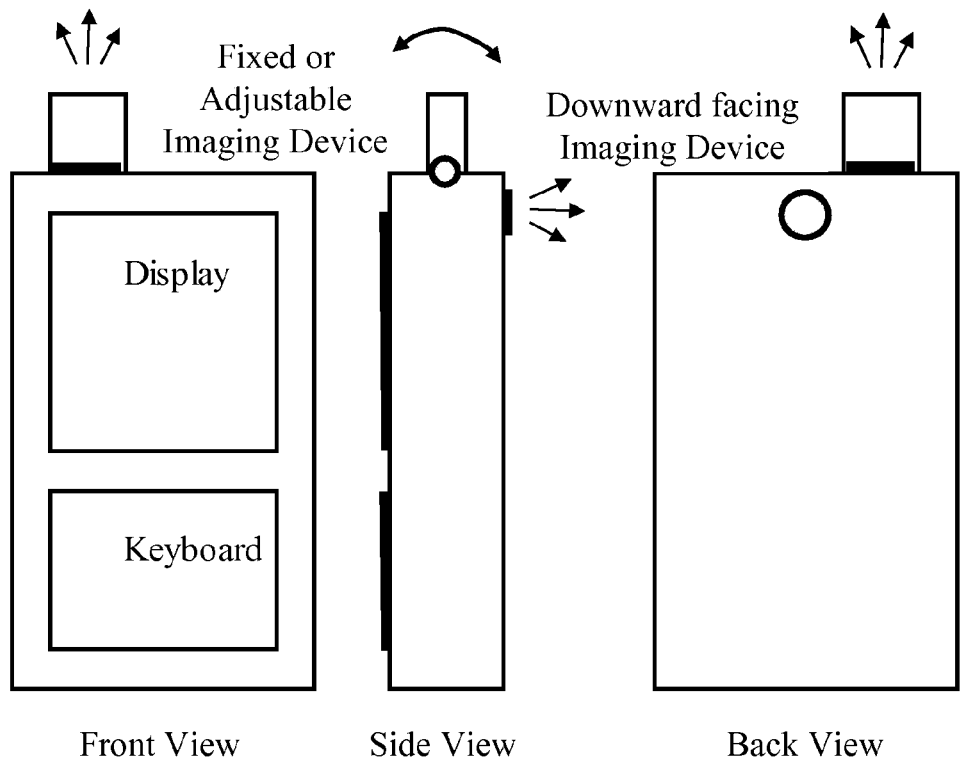
FIG. 3 is a simplified diagram of a handheld device for providing imaging and data collection functionality in accordance with an embodiment of the invention.

An example of such a device is provided in FIG. 3, which includes a front view of a data collector that includes an imaging device on a top edge. The imaging device on the top edge may be used for coarse position guidance using a navigational graphic as described above with regard to FIG. 2. However, it may not be easy to use such a device for fine position guidance (identifying the point of interest to within a few centimeters or less).

For fine position guidance, a swiveling lens assembly, as indicated by the double-sided arrow above the imaging device in the side view, allows the lens to be switched from pointing in a direction substantially parallel to a main axis of the data collector (i.e., looking outward in a horizontal direction), to a direction substantially perpendicular to the main axis (i.e., looking downward in a vertical direction). The lens may also be switched to any other direction between the substantially parallel and substantially perpendicular positions. This allows the imaging device to gather image data that includes the point of interest even when the device is substantially above the point of interest. With the imaging device pointing in a downward direction, the data collector can be used for fine position guidance (or more accurate position determination) using a navigational graphic as described above with regard to FIG. 2.

Alternatively, a second imaging device may be mounted on a backside or bottom face of the data collector as shown in the side and back views of FIG. 3. Here, the imaging device on the top edge may be adjustable as described above, or it may be fixed to point in an outward direction. In this configuration, the second imaging device may be pointing downward while the imaging device on the top edge is pointing outward. Once in the vicinity of a point of interest, image data from the second imaging device will include the point of interest, even if the point of interest is outside a field of view of the imaging device on the top edge. With the second imaging device pointing in a downward direction, the data collector can be used for fine position guidance (or more accurate position determination) using a navigational graphic as described above with regard to FIG. 2.

Figure 4:
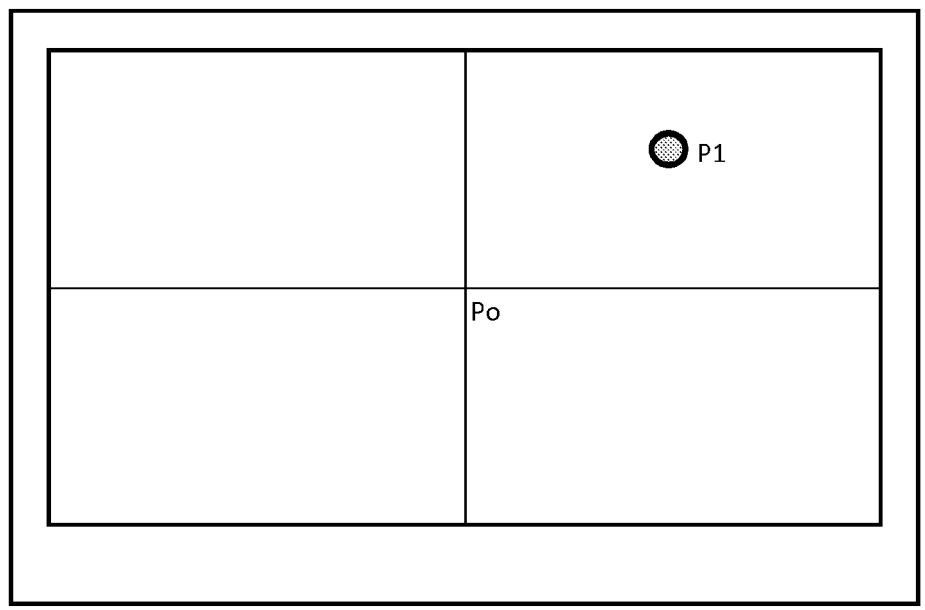
FIG. 4 is a simplified diagram of a display monitor showing a current location $P_0$ and a point of interest $P_1$ in accordance with an embodiment of the invention.

The visual display of the data collector may be used to display the image data acquired by the imaging device(s). For example, the visual display may display image data from the imaging device on the top edge while navigating to within a vicinity of a point of interest, and once within the vicinity, the visual display may display the image data from the downward pointing imaging device (either the imaging device on the top edge adjusted to point downward or the second imaging device). In either case, the data collector may overlay a navigational graphic identifying a current position of the data collector and a location of the point of interest. This is shown in FIG. 4, where overlaid crosshairs intersect at a current position ($P_0$), and an overlaid graphic (or dot) identifies a location of the point of interest ($P_1$). The point of interest can be identified when the current position $P_0$ and the point of interest $P_1$ are congruent (or aligned).

Imaging Device Coupled to a Surveying Pole

Figure 5:
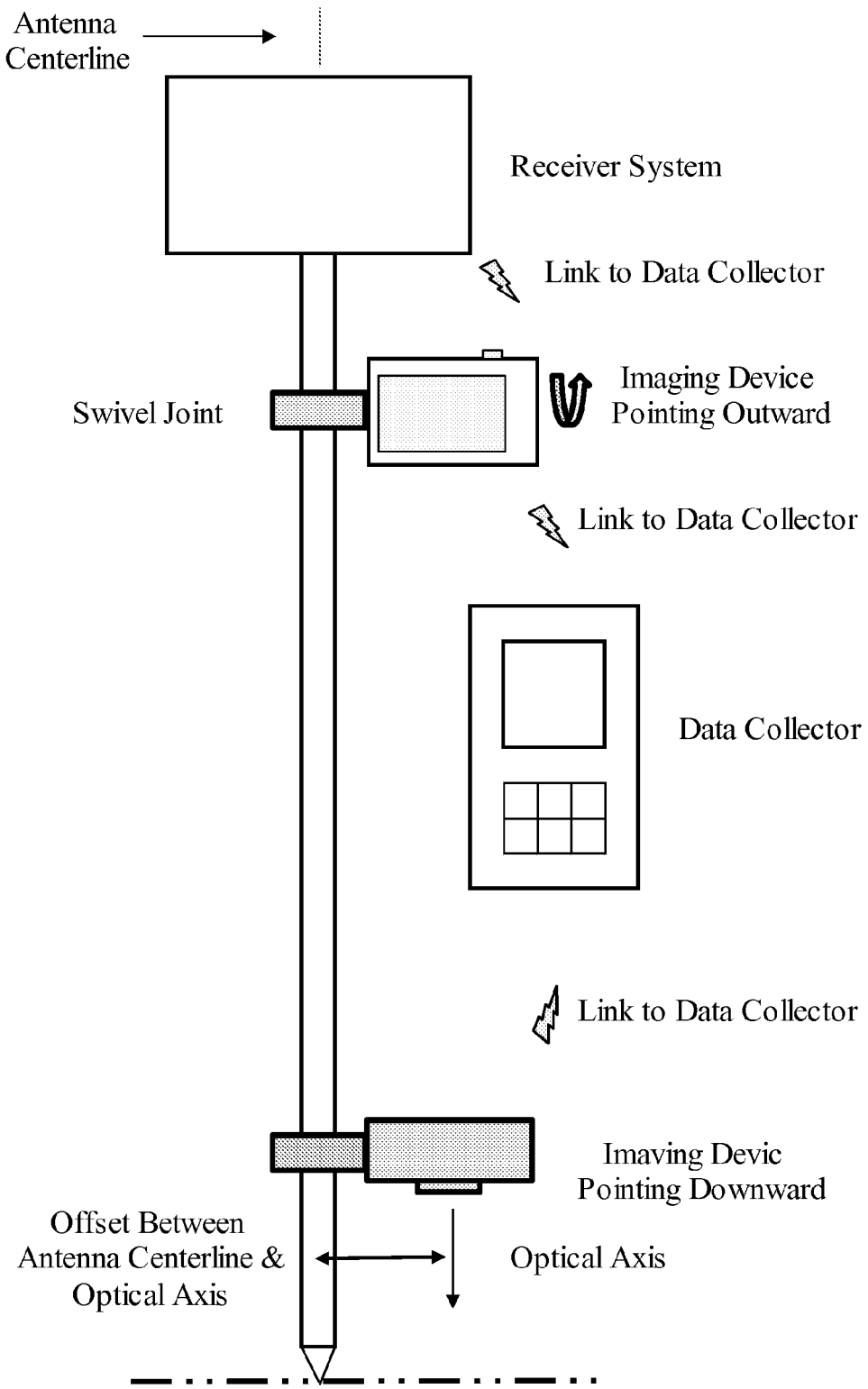
FIGS. 5-7 are simplified diagrams of apparatuses for providing navigational information associated with points of interest in accordance with some embodiments of the invention.

In another embodiment, an apparatus similar to that shown in FIG. 2 may include multiple imaging devices (or cameras) affixed to a surveying pole as shown in FIG. 5. The imaging devices may each have a link (e.g., a wireless link) to a data collector so that they can provide image data for display on the data collector. The upper imaging device may include a fixed mounting system to provide an outward pointing orientation, or an adjustable mounting system (e.g., swivel joint) to provide a variable pointing direction. In an embodiment, the mounting system may include a two-position detent mount so that the upper imaging device can be switched from pointing in a direction substantially perpendicular to a main axis of the surveying pole (i.e., looking outward in a horizontal direction), to a direction substantially parallel to the main axis (i.e., looking downward in a vertical direction). Such a detent mounting system may be built into the surveying pole or it may be attached with a clamping arrangement.

The lower imaging device may include a fixed or variable mounting system to provide a downward pointing orientation. A contact point of the surveying pole may be included in a field of view of the lower imaging device. Using this configuration, the upper imaging device may be used for coarse position guidance using a navigational graphic as described above with regard to FIG. 2, and the lower imaging device may be used for fine position guidance (or more accurate position determination) using a navigational graphic as described above with regard to FIG. 3.

Alternatively, a laser pointer system may be integrated with the lower imaging device. The laser pointer system may be configured to direct a laser beam substantially along an optical axis (or main pointing axis) of the imaging device. In some embodiments, the laser pointer system may be arranged inside the lower imaging device and use a half-silvered mirror in accordance with known techniques. In other embodiments, the laser pointer system may be arranged outside the lower imaging device in front of a lens. Such an external system may be used as an add-on to an existing imaging device.

In either embodiment, the laser beam can be used to provide a laser mark on the ground (or on another object). A location (or coordinates) of the laser mark can be determined in accordance with known techniques using (i) a position of a receiver system (e.g., a GNSS antenna and receiver) coupled to the surveying pole, (ii) a height of the receiver system above a contact point of the surveying pole, (iii) an azimuth of the lower imaging device, and (iv) an offset between an antenna centerline of the receiver system and an optical axis of the imaging device (or of the laser beam). If the surveying pole is unleveled, a tilt direction and tilt magnitude may also be used.

The laser mark can be used to improve precision of identifying a point of interest. For example, the upper imaging device may be used for coarse position guidance using a navigational graphic as described above with regard to FIG. 2, and the lower imaging device may be used for fine position guidance (or more accurate position determination) using a navigational graphic as described above with regard to FIG. 3. For the fine position guidance, displayed image data will include the laser mark. Identifying the point of interest involves moving the surveying pole until the laser mark and the navigational graphic are aligned.

In the configuration shown in FIG. 5, the imaging devices may be located anywhere along a length of the surveying pole. Positioning the lower imaging device near the contact point allows the laser beam and the point of interest to be identified more clearly in the displayed image data. An accuracy with which the point of interest can be determined depends primarily on accuracy of the receiver system and degree of verticality of the surveying pole (or an accuracy with which the tilt direction and tilt magnitude are determined and accounted for).

In another embodiment, the data collector may be operated in conjunction with a total station and prism pole having multiple imaging devices similar to that shown in FIG. 5.

Imaging Device Integrated with Receiver System

Figure 6:
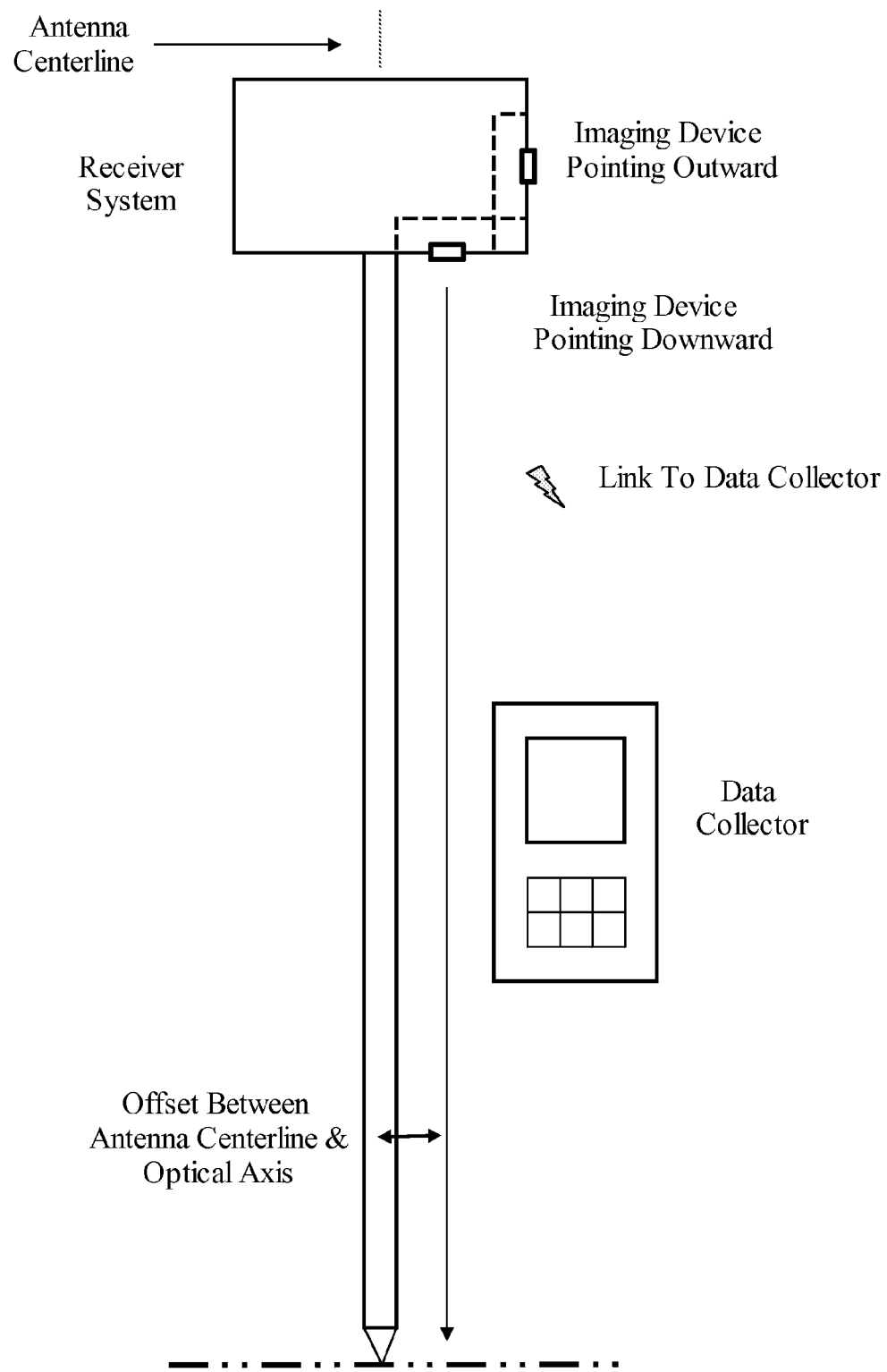

In an embodiment, one or more imaging devices may be integrated with a receiver system (e.g., a GNSS antenna and receiver) as shown in FIG. 6. In this example, the imaging devices are mounted within a housing of the receiver system. The housing may also include a power supply and a short-range radio system (e.g., Bluetooth) for delivering image data to the data collector. One imaging device may be mounted so that it is pointing in a direction substantially perpendicular to a main axis of a surveying pole (i.e., looking outward in a horizontal direction). Another imaging device may be mounted so that it is pointing in a direction substantially parallel to the main axis (i.e., looking downward in a vertical direction).

In this configuration, the outward looking imaging device may be used for coarse position guidance using a navigational graphic as described above with regard to FIG. 2, and the downward looking imaging device may be used for fine position guidance (or more accurate position determination) using a navigational graphic as described above with regard to FIGS. 3 and/or 5. A point of interest may be identified by bringing a contact point of the surveying pole and a point of interest into alignment using one or more navigational graphics overlaid on image data displayed on the data collector. Alternatively, a laser pointer system may be integrated with the downward looking imaging device in a manner similar to that described above with regard to FIG. 5.

In another embodiment, the data collector may be operated in conjunction with a total station and prism pole having multiple imaging devices similar to that shown in FIG. 6.

Contact Point as Indicator

Figure 7:
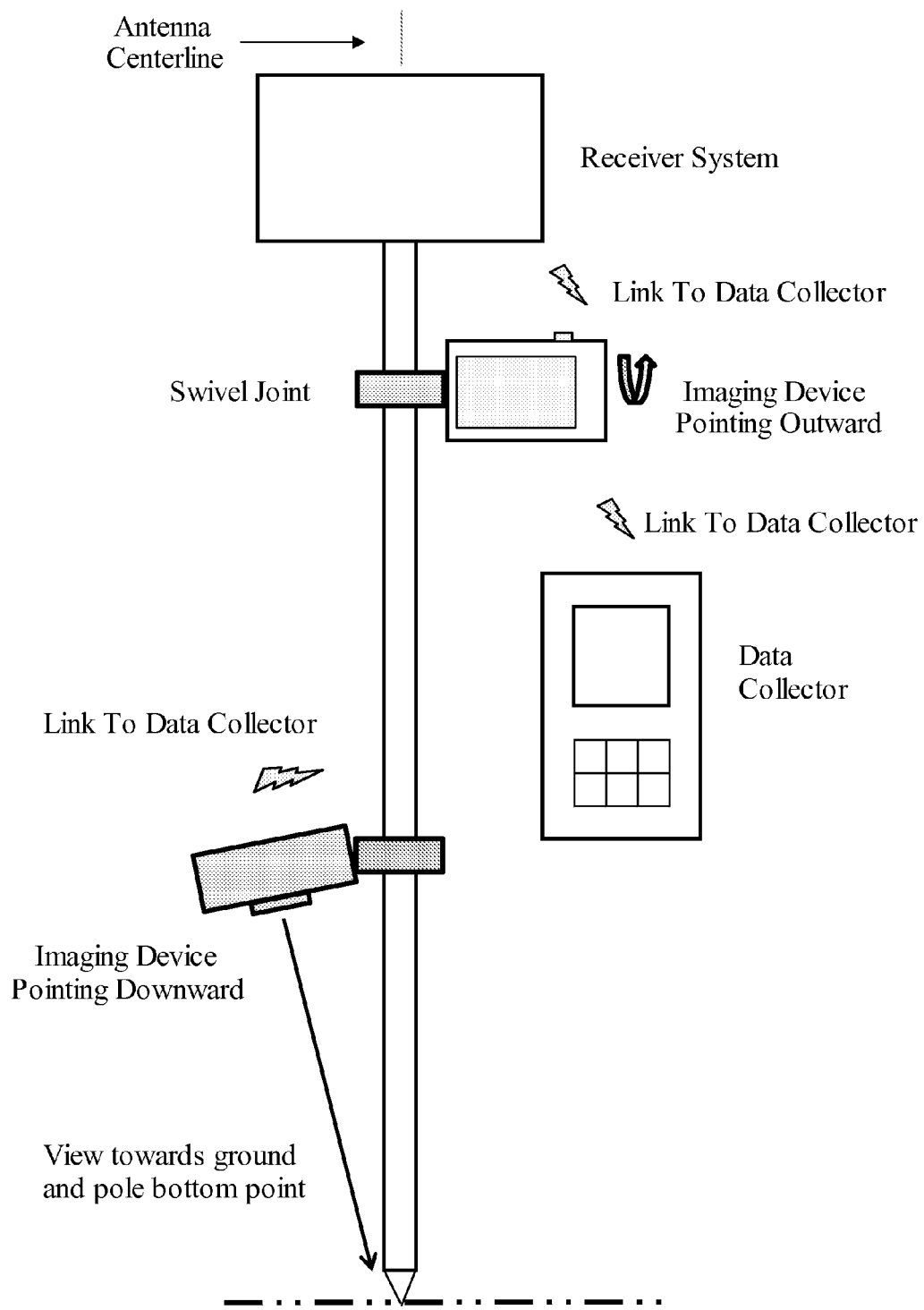

With a downward looking imaging device located in close proximity to a surveying pole (e.g., offset a few centimeters), a field of view of the downward looking imaging device can include a contact point of the surveying pole as shown in FIG. 7. The downward looking imaging device can be pointed at an angle so that its optical axis (or central axis) is aimed at the contact point (or tip) of the surveying pole. Thus, the contact point and the optical axis can be substantially aligned. The contact point of the surveying pole becomes a point in the image. A user can position the surveying pole close to a point of interest and move the surveying pole so that the contact point is over the point of interest (or congruent with a navigational graphic that is overlaid on image data displayed on the data collector). The contact point and the point of interest as indicated by the navigational graphic on the display will merge when the contact point is over the point of interest.

Laser Pointer System

Figure 8:
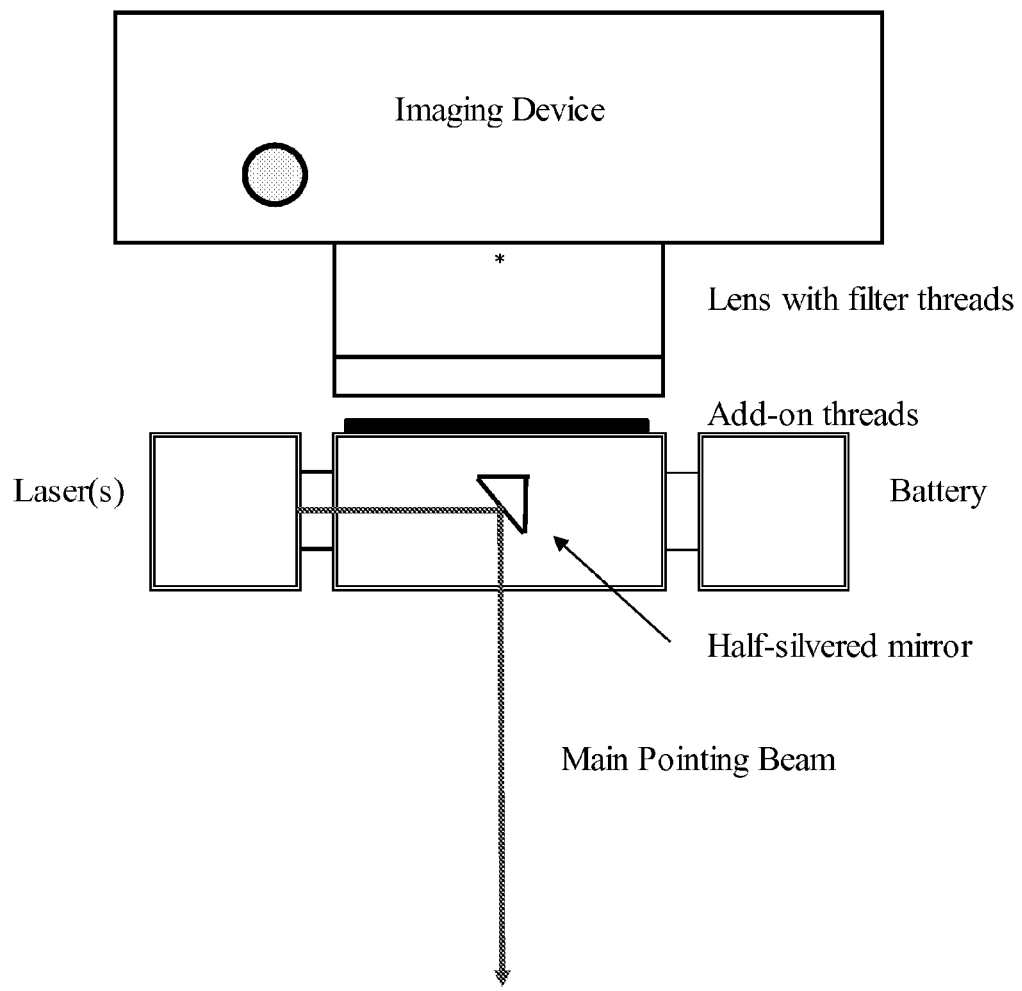
FIG. 8 is a simplified diagram of an imaging device having a laser beam extending along an optical axis in accordance with an embodiment of the invention.

As described above, a laser pointer system can be used to improve precision of identifying a point of interest. Such a laser pointer system may be useful when integrated with any of the embodiments shown in FIGS. 3 and 5-6 described above. While the laser pointer system may be arranged inside or outside an imaging device, FIG. 8 provides an example where the laser pointer system is arranged outside the imaging device. In this example, the laser pointer system utilizes a half-silvered mirror mounted in front of a lens. The laser pointer system includes a laser source (e.g., a laser diode), a power supply (e.g., battery), the half-silvered mirror, and a suitable mounting system. The mounting system may consist of a clamping arrangement that affixes the imaging device (or to a lens if the lens extends beyond a body of the imaging device). In FIG. 8, the laser pointer system includes a threaded portion configured to mount with threads on the lens. The threads on the lens may be those normally used to install filters. Embodiments of the present invention are not limited to this particular configuration, however, and may include any type of laser pointer system mounted inside or outside the imaging device.

Angled Pointing Tool

Figure 9:
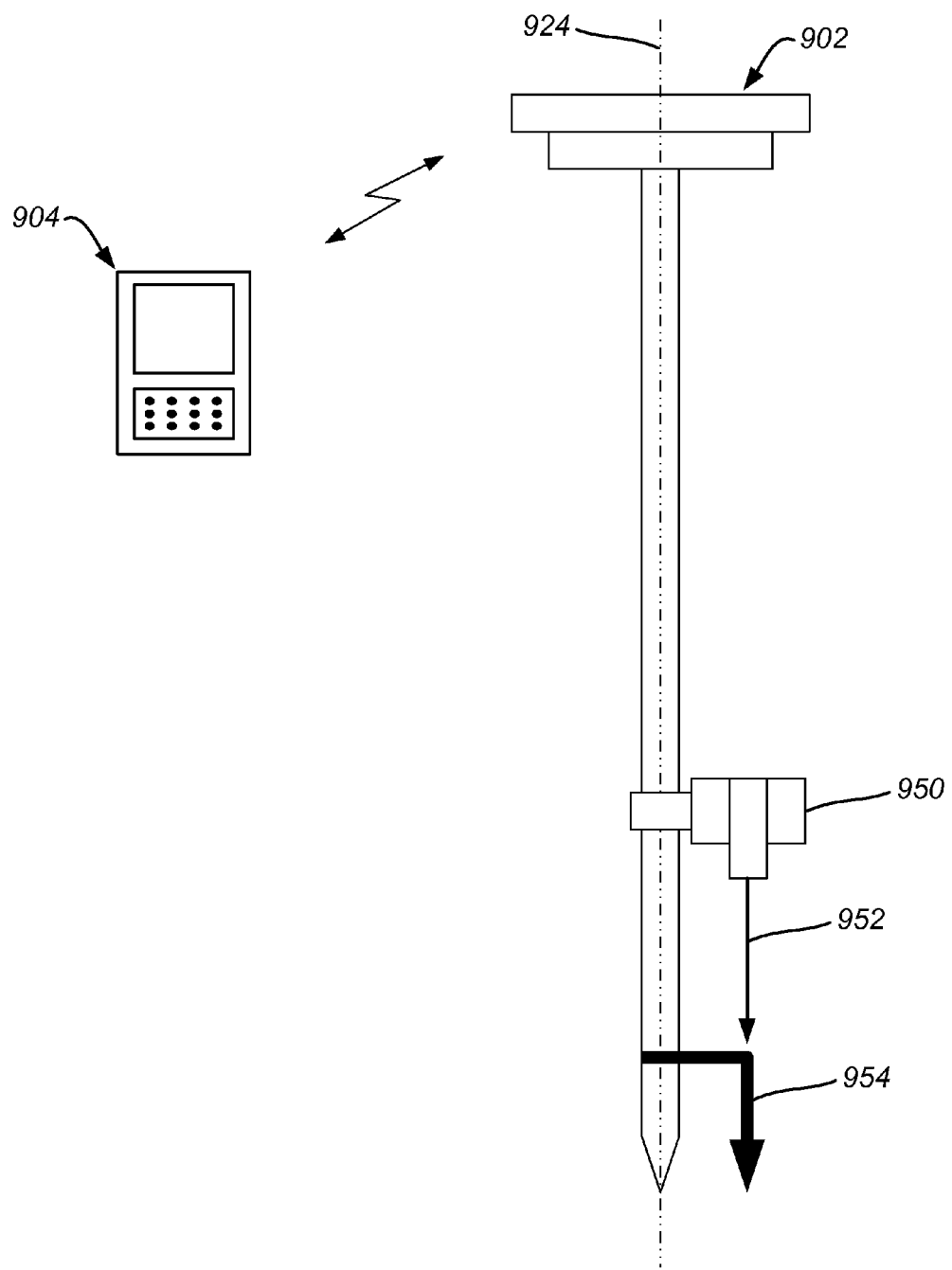
FIG. 9 is a simplified diagram of an apparatus for providing navigational information integrated with a pointing device in accordance with an embodiment of the invention.

FIG. 9 shows an imaging device 950 pointed downward and parallel to an axis 924 of a surveying pole 902 in accordance with an embodiment. A laser pointer system may be integrated with the imaging device 950 and configured to direct a laser beam substantially along an optical axis 952 of the imaging device 950. As described above with regard to FIG. 5, the laser beam can be used to provide a laser mark on the ground (or on another object), and a location of the laser mark can be determined. Although not specifically shown in this example, a data controller 904 may include an imaging device that may be used for coarse position guidance using a navigational graphic as described above with regard to FIG. 2, and the imaging device 950 may be used for fine position guidance (or more accurate position determination) using a navigational graphic as described above with regard to FIGS. 3 and/or 5.

In an alternative embodiment, an angled pointing tool 954 may be used in addition to or in place of the laser pointer system to locate (or identify) the point of interest. This short "spike" may comprise a cylindrical rod with a pointed end or may comprise a small ring thru which the laser beam passes. A user can position the surveying pole 902 close to a point of interest and move the surveying pole 902 so that the angled pointing tool 954 is over the point of interest (or over a navigational graphic that is overlaid on image data as displayed on the data collector 904).

Precision Locating Apparatus

Accuracy of a GNSS antenna and receiver system operating with real-time kinematic (RTK) and virtual reference station (VRS) corrections is typically less than two centimeters absolute with respect to a known reference (under certain but normal conditions). Improved accuracy can be obtained with additional processing. In some applications, millimeter-level accuracy is required. This level of accuracy can be difficult to obtain using the apparatuses shown in FIGS. 3, 5-7, and 9.

Figure 10A:
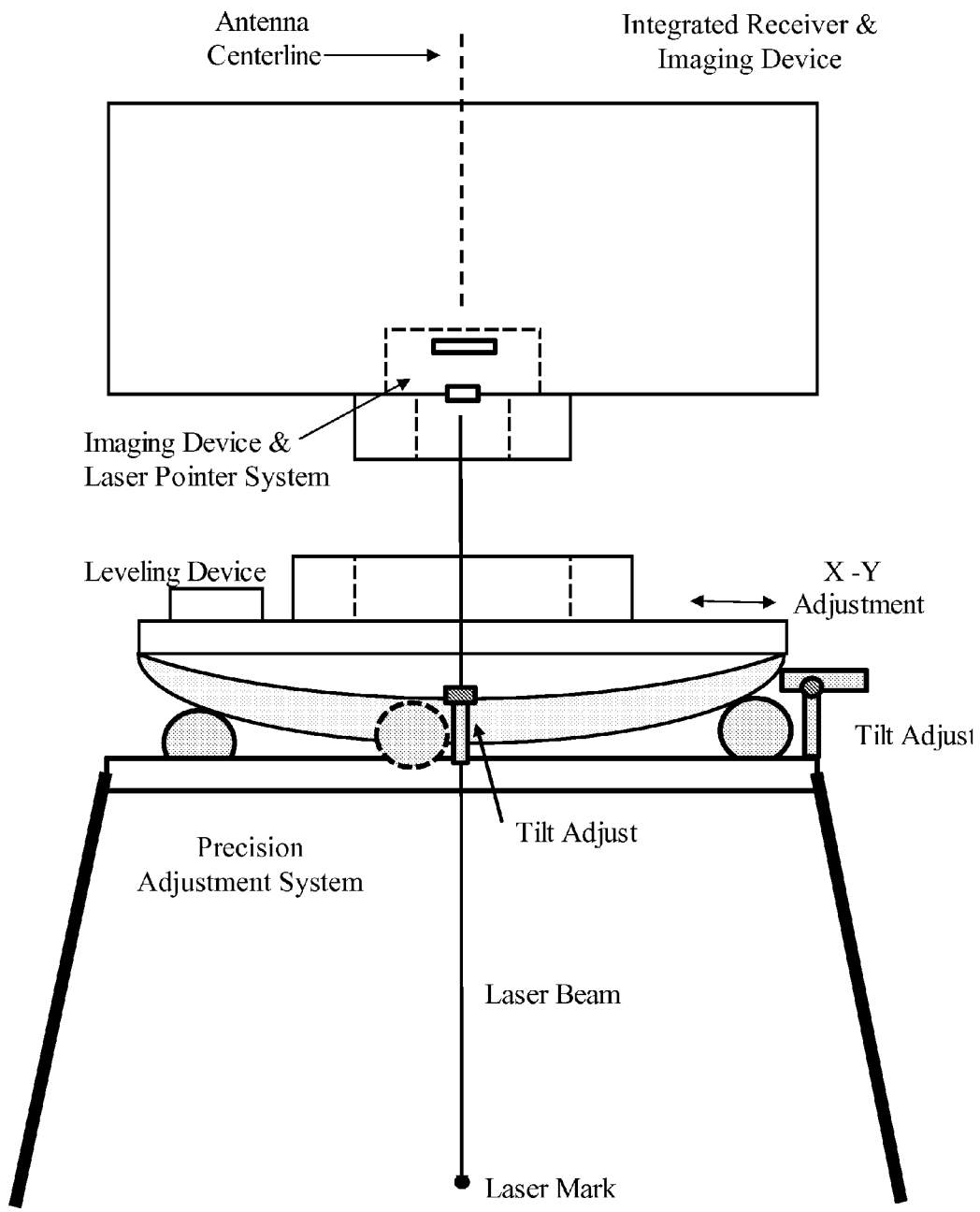
FIGS. 10A-10C are simplified diagrams of apparatuses for identifying points of interest using an integrated receiver and imaging device with a precision adjustment system in accordance with some embodiments of the invention.

FIG. 10A is a simplified diagram of a precision locating apparatus in accordance with an embodiment of the invention. This example includes an integrated receiver and imaging device that can be mounted to (and detached from) a precision adjustment system. Although not specifically shown in this figure, a data controller, similar to the various data collectors shown and described in the previous examples, may also be included. The data collector may be configured to communicate (e.g., via a wireless link) with the integrated receiver and imaging device.

The integrated receiver and imaging device includes a receiver system and an imaging device. The receiver system may include, for example, a GNSS antenna and receiver. The imaging device may be integrated with a laser pointer system and mounted to provide a downward pointing orientation (i.e., looking downward in a vertical direction) when mounted to the precision adjustment system.

The precision adjustment system may include multiple legs or supports (e.g., a tripod), a mounting system for mounting with the integrated receiver and imaging device, and a leveling system. The mounting system is not limited and may include any type of mount capable of attaching (or supporting) the integrated receiver and imaging device. The leveling system may include a leveling device (e.g., a bubble level), an X-Y adjustment mechanism, and tilt adjust.

In an embodiment, a coarse position guidance may be performed as described above with regard to FIG. 2 using an outward looking imaging device that may be included with the integrated receiver and imaging device (not shown). Alternatively, an imaging device included with a data controller may be used. If an outward looking imaging device is included with the integrated receiver and imaging device, the integrated receiver and imaging device may be coupled with a surveying pole and used for the coarse position guidance (similar to that shown and described above with regard to FIGS. 5-7 and 9). Just as the integrated receiver and imaging device can be mounted to (and detached from) the precision adjustment system, it may also be mounted to (and detached from) the surveying pole.

For fine position guidance, the precision adjustment system may be positioned over an approximate location of the point of interest. The integrated receiver and imaging device can be detached from the surveying pole (if necessary) and mounted to the precision adjustment system. A leveling procedure may be performed using the leveling system either before or after mounting the integrated receiver and imaging device.

When the integrated receiver and imaging device is mounted to the precision adjustment system, the downward looking imaging device has a field of view that includes the ground underneath the precision adjustment system. This may be enabled by a hole or transparent section in the precision adjustment system. This also allows a laser beam (generated by the laser pointer system) to provide a laser mark on the ground. The integrated receiver and imaging device is arranged so that an antenna centerline, an optical axis of the imaging device, and the laser beam are substantially aligned. Alignment errors can be determined in accordance with known techniques and accounted for with an offset correction.

In an embodiment, the integrated receiver and imaging device is mounted to the precision adjustment system by inserting a mounting system into a receiving flange at a top part of an adjustment platform. Merely by way of example, the adjustment platform can be adjusted with respect to local vertical using orthogonal gimbal adjustments according to well-known leveling principles. The gimbal adjustments may be locked into position via hand screws or other suitable mechanisms. A bubble level may be used to indicate when the adjustment platform is in an acceptable horizontal position.

For fine position guidance, image data (displayed either on a display included with the integrated receiver and imaging device and/or on the data collector) provides an image of the ground underneath the precision adjustment system. The image includes the laser mark (aligned with the antenna phase center of the receiver and the optical axis of the imaging device). A navigational graphic may be overlaid on the image data to indicate the point of interest. The point of interest is identified by bringing the laser mark and the point of interest into alignment on the display using X-Y adjustments on the adjustment platform. A user can then mark the point of interest (identified by the laser mark).

Figure 11A:
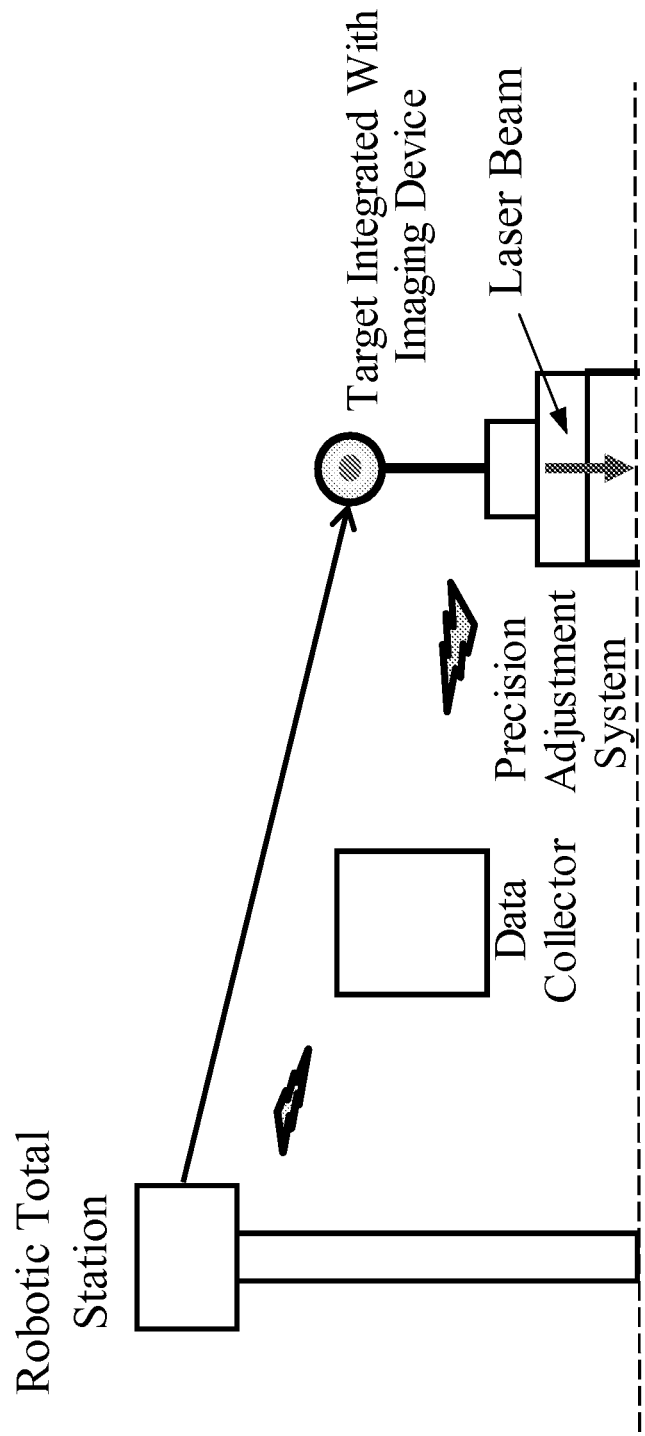
FIGS. 11A-11B are simplified diagrams of apparatuses for identifying points of interest using robotic total stations in accordance with some embodiments of the invention.

In another embodiment, the receiver system may be replaced with a survey target (e.g., black and white concentric circles on a rod) as shown in FIG. 11A. In this embodiment, an imaging device may be coupled to the survey target similar to the integrated receiver and imaging device described above with regard to FIG. 10A. The target may be tracked by a robotic total station and location information provided to a data collector via a wireless link. With the location information from the robotic total station, fine position guidance can be performed as described above with regard to FIG. 10A.

Figure 10B:
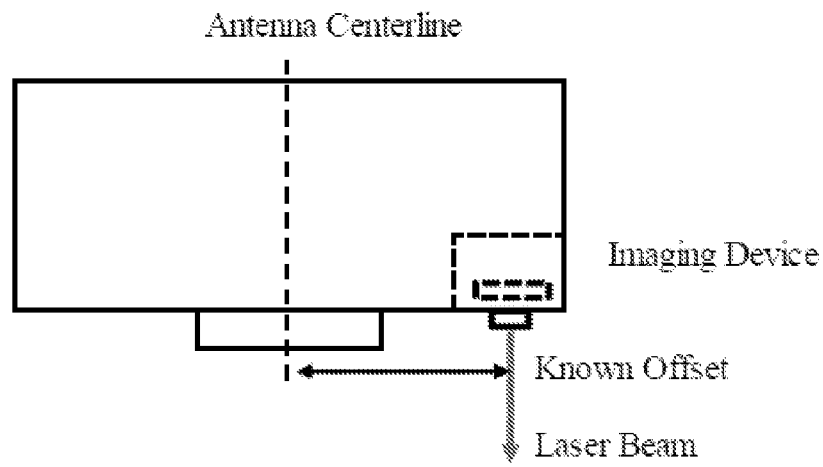
Figure 10B:
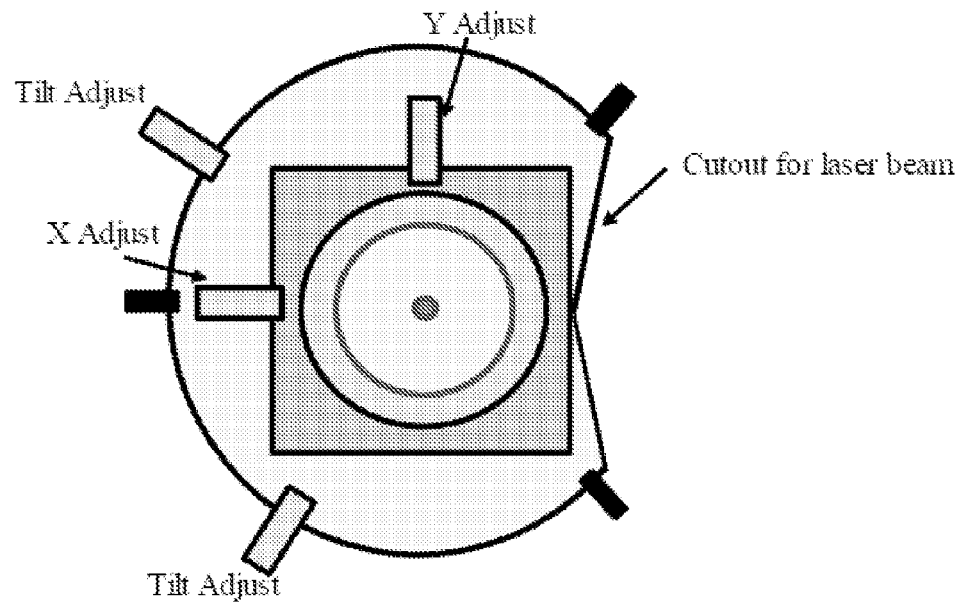

The precision locating apparatus shown in FIG. 10A is provided merely as an example, and precision locating apparatuses in accordance with embodiments of the invention are not limited to any specific configuration. For example, FIG. 10B shows an alternative configuration where an imaging device is disposed near an edge of the integrated receiver and imaging device. With this configuration, a cutout allows the laser beam to illuminate the ground underneath the precision adjustment system. This configuration also enables use of another imaging device mounted to provide an outward pointing orientation (i.e., looking outward in a horizontal direction). A split prism may be used to obtain image data from both outward and downward directions. Alternatively, multiple imaging devices may be used similar to the example shown in FIG. 6.

Figure 12:
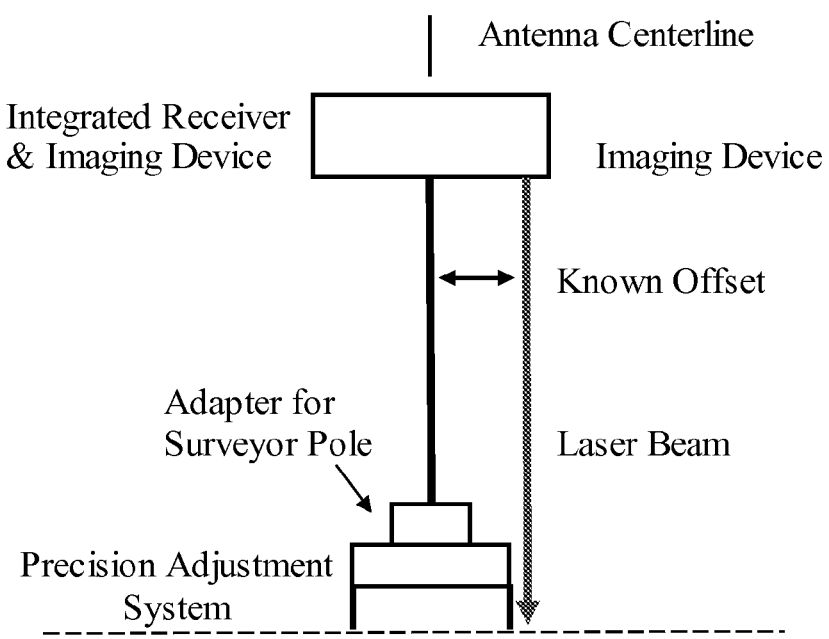
FIG. 12 is a simplified diagram of an apparatus for identifying points of interest using an integrated receiver and imaging device with a precision adjustment system in accordance with an embodiment of the invention.

Yet another alternative configuration is shown in FIG. 12, where a laser beam emanating from a laser pointer system integrated within a housing of a receiver extends toward the ground beyond an edge of a precision adjustment System. In FIG. 12, an integrated receiver and imaging device is coupled to a surveying pole, and the precision adjustment system is configured to receive the surveying pole. In this configuration, the integrated receiver and imaging device does not need to be detached from the surveying pole for fine position guidance.

Figure 10C:
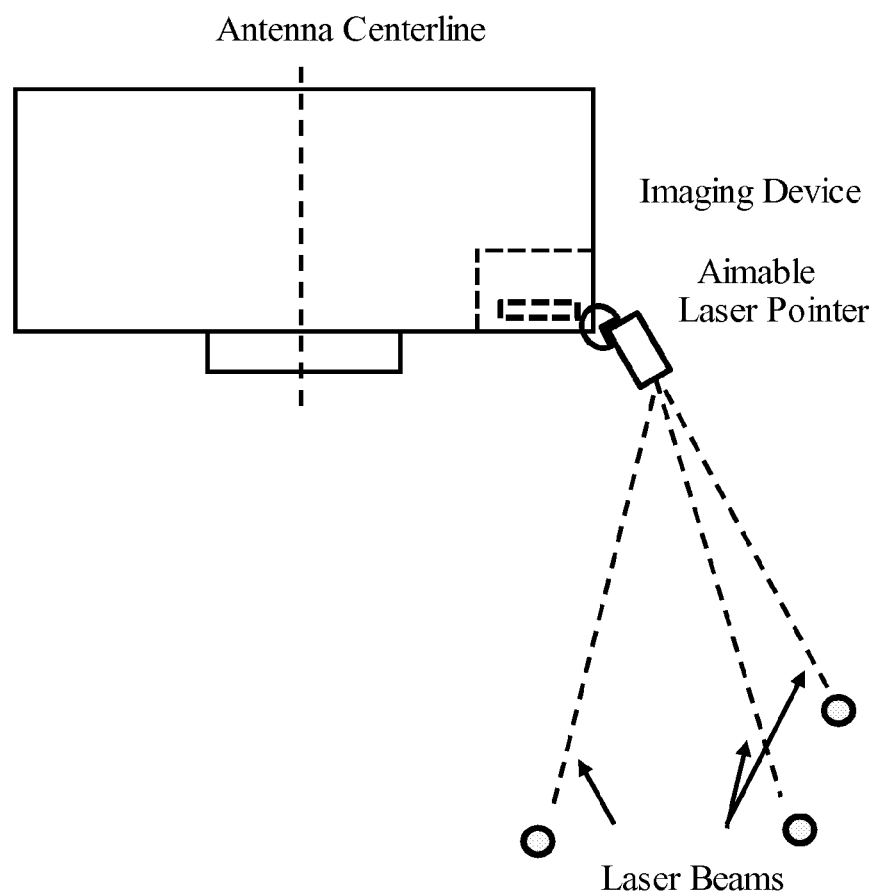
Figure 11B:
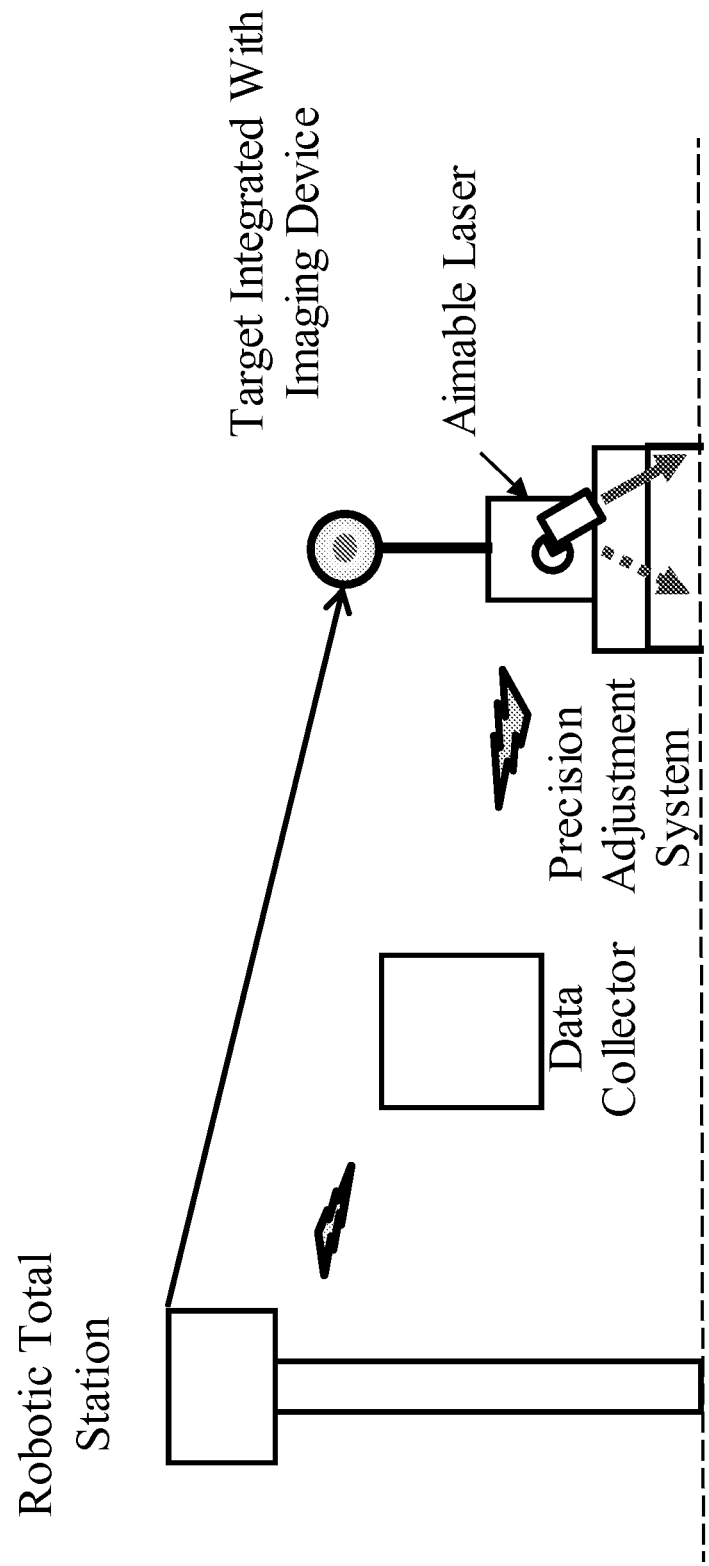
Figure 13:
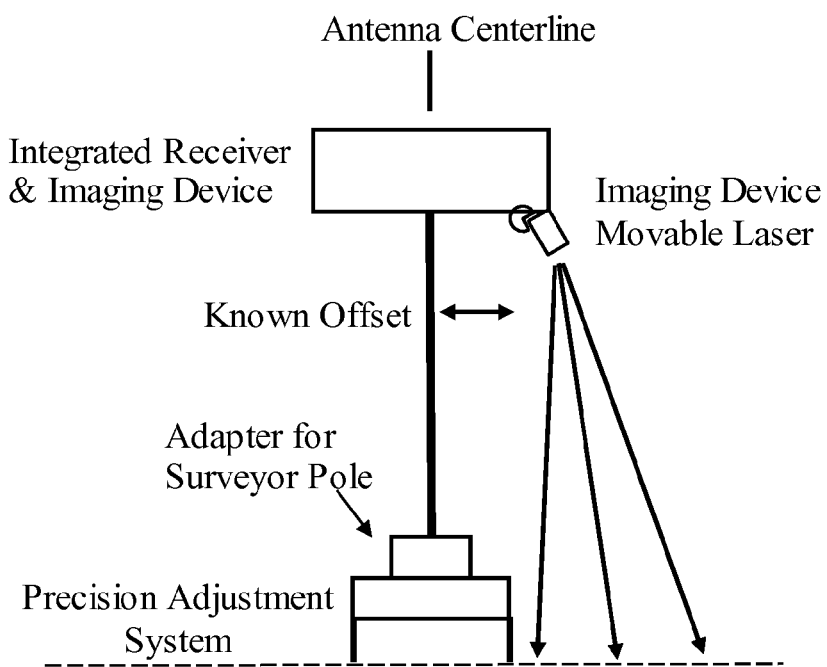
FIG. 13 is a simplified diagram of an apparatus for identifying points of interest using an integrated receiver and imaging device with an adjustable laser in accordance with an embodiment of the invention.

In yet another embodiment, the laser pointer system may be moveable under computer control as described in U.S. Pat. No. 6,052,083, issued Apr. 18, 2000, the entire contents of which are incorporated herein by reference in their entirety. Such a movable (or aimable) laser system is shown in conjunction with an integrated receiver and imaging device in FIGS. 10C and 13, and in conjunction with a survey target and robotic total station system in FIG. 11B. The movable laser system may be used either in conjunction with or in place of a fixed laser in any of the embodiments that utilize a laser pointer system. The movable laser system can be used to identify a current position as well as a location of a point of interest.

Figure 14:
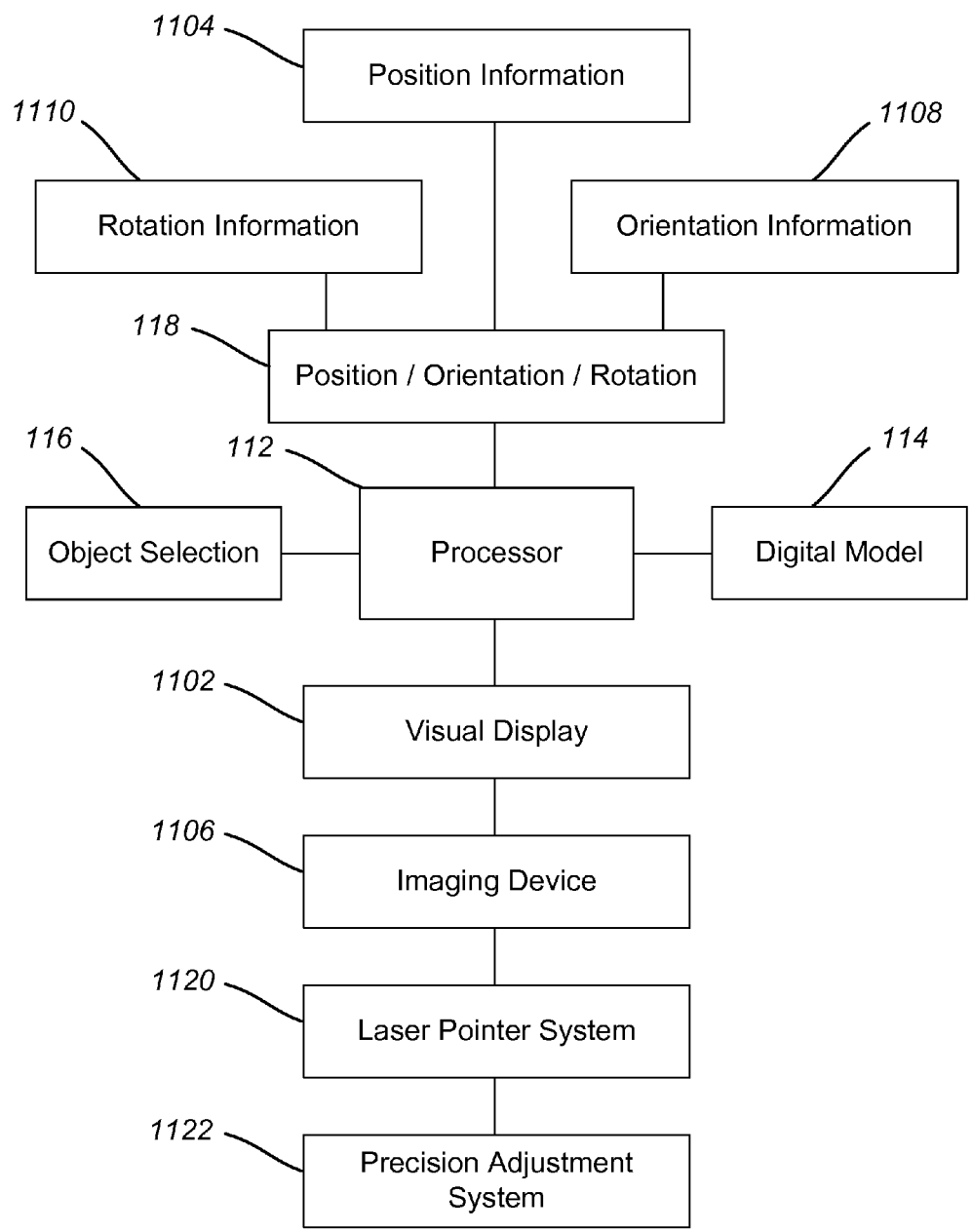
FIG. 14 is a block diagram of an apparatus for navigating to and identifying a point of interest in accordance with an embodiment of the invention.

FIG. 14 is a block diagram of an apparatus for navigating to and identifying a point of interest in accordance with an embodiment of the invention. FIG. 14 shows position information 1104, orientation information 1108, and rotation information 1110 provided to position/orientation/rotation system 1118. The position information 1104 may be provided by GNSS or an optical total station in accordance with known techniques. The orientation information 1108 may be provided by a compass, magnetometer and one or more gyros, or the like. The rotation information 1110 may be provided by a tilt meter, one or more gyros, magnetometers, accelerometers, or the like. The position/orientation/rotation system 1118 may include a processor configured to receive and analyze the information as described previously.

FIG. 14 also shows an object selection system 1116. The object selection system 1116 may include an input device configured to facilitate selection of an object by an operator. For example, the object selection system 1116 may enable entry of GNSS or GPS coordinates of a point, selection of a point from a list of points, or selection of a point from a digital model 1114. The digital model 1114 may be stored in local memory or accessed from a remote database.

FIG. 14 also includes an imaging device 1106 and a laser pointer system 1120. The imaging device 1106 may be configured to acquire image data and provide the image data to a visual display 1102. In some embodiments, the imaging device 1106 may include multiple imaging devices. The laser pointer system 1120 may be configured to either direct a beam along an optical axis of a camera (or parallel to an optical axis of a camera) or to move under computer control to identify a location of a point of interest. In this example, the visual display 1102, the object selection system 1116, the digital model 1114, the position/orientation/rotation system 1118, and optionally the laser pointer system 1120 may each be coupled to the processor 1112. The processor 1112 may include one or more processors configured to determine the image coordinates associated with points of interest, to generate and superimpose navigational graphics on the visual display 1102, and/or to identify locations of points of interest as described previously. This example also includes a precision adjustment system 1122. The precision adjustment system 1122 may be used for fine position guidance as described previously.

Figure 15:
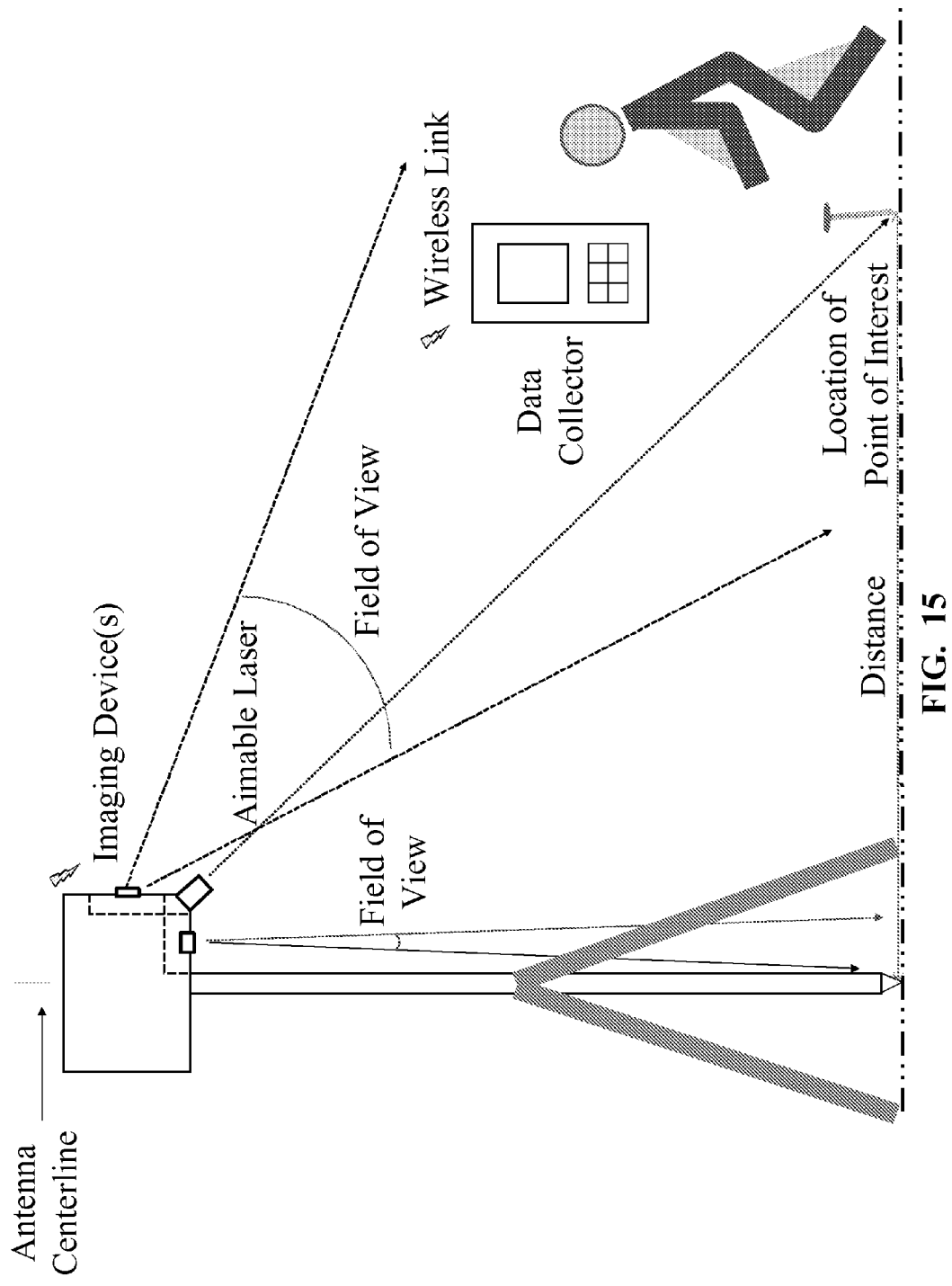
FIG. 15 is a simplified diagram illustrating a method for navigating to and identifying a point of interest having known coordinates in a reference frame in accordance with an embodiment of the invention.

FIG. 15 is a simplified diagram illustrating a method for navigating to and identifying a point of interest having known coordinates in a reference frame in accordance with an embodiment of the invention. This figure shows an integrated receiver and imaging device with forward and downward looking lenses. The integrated receiver and imaging device is coupled to a surveying pole. In this embodiment, the integrated receiver and imaging device is brought within a vicinity (e.g., a few meters or less) of a point of interest. The integrated receiver and imaging device is oriented to determine an azimuth. A stabilization device (such as a bipod) is used to maintain the integrated receiver and imaging device in a fixed position while an operator marks the point of interest. The point of interest is identified by a beam of a movable laser.

In another embodiment similar to that illustrated in FIG. 15, image data acquired by the imaging device(s) may be displayed on a data collector along with navigational graphics identifying a current position of an integrated receiver and imaging device and a location of at least one point of interest. The data collector is oriented using a compass, clicking on a known point in the image, or the like. As the operator leaves the integrated receiver and imaging device and moves with the data collector towards the point of interest, he will see himself in the image data and can identify the point of interest when his hand or a marker is congruent with the navigational graphic identifying the point of interest on the display. In this embodiment the integrated receiver and imaging device may not include a laser pointer system.

It should be appreciated that some embodiments of the present invention may be implemented by hardware, software, firmware, virtual machine, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

It is to be understood that the features of one or more embodiments of the invention may be combined with one or more features of other embodiments of the invention without departing from the scope of the invention. Also, the examples and embodiments described herein are for illustrative purposes only and various modifications or changes in light thereof will be suggested to persons skilled in the art and are to be included within the spirit and purview of this application and scope of the appended claims.

What is claimed is:

1. An apparatus configured to assist a user in navigating to and identifying a point of interest at a known position in a reference frame, comprising:
   a visual display configured to display image data;
   a laser mounted to a surveying pole in a downward-pointing orientation;
   a first imaging device configured to obtain first image data, the first imaging device having an optical axis extending in a first direction;
   a second imaging device configured to obtain second image data, the second imaging device having an optical axis extending in a second direction substantially perpendicular to the first direction, wherein:
      the first imaging device and the second imaging device are arranged such that when the apparatus is at a first position the point of interest is within a field of view of the first imaging device and outside a field of view of the second imaging device;
      when the apparatus is at a second position the point of interest is outside the field of view of the first imaging device and within the field of view of the second imaging device;
      a laser mark, generated by the laser, is within the field of view of the second imaging device; and
      the first imagining device and the second imaging device are mounted to the surveying pole; and
   one or more processors configured to:
      determine first image coordinates of the first image data associated with a location of the point of interest, and when the visual display is displaying the first image data, to superimpose a first navigational graphic on the visual display overlaid on the first image coordinates; and
      determine second image coordinates of the second image data associated with the location of the point of interest, and when the visual display is displaying the second image data, to superimpose a second navigational graphic on the visual display overlaid on the second image coordinates.

2. The apparatus of claim 1 further comprising a receiver configured to determine a position of the apparatus, wherein the one or more processors are further configured to superimpose a navigational graphic on the visual display overlaid on the position of the apparatus.

3. The apparatus of claim 1 wherein the laser is external to the second imaging device.

4. The apparatus of claim 1 wherein the first imaging device and the second imaging device are integrated within a handheld data collector.

5. The apparatus of claim 1 wherein the surveying pole is a prism pole.

6. The apparatus of claim 1 wherein the first imaging device and the second imaging device are disposed within a housing of a global navigation satellite system (GNSS) receiver, and the housing of the GNSS receiver is coupled to the surveying pole.

7. The apparatus of claim 1 wherein the visual display is disposed on a handheld data collector.

8. A method for providing navigational information to a user, where the navigational information can be used by the user to navigate to and identify a point of interest, the point of interest being at a known position in a reference frame, the method comprising:
   performing a coarse position guidance procedure that includes:
      using a first imaging device having an optical axis that points outward in a substantially horizontal direction to obtain first image data, the point of interest being within a field of view of the first imaging device at a first position, and the point of interest being outside the field of view of the first imaging device at a second position, where the second position is closer to the point of interest than the first position, and wherein the first imaging device is mounted to a surveying pole;
      providing the first image data on a visual display; and
      providing a first navigational graphic on the visual display, the first navigational graphic overlaid on a portion of the first image data associated with the point of interest; and thereafter
   performing a fine position guidance procedure that includes:
      using a second imaging device having an optical axis that points downward in a substantially vertical direction to obtain second image data, the point of interest being outside a field of view of the second imaging device at the first position, and the point of interest being within the field of view of second first imaging device at the second position, and wherein the second imaging device is mounted to the surveying pole;
      imaging a laser mark, using the second imaging device, the laser mark generated by a laser mounted to the surveying pole in a downward-pointing orientation;
      providing the second image data on the visual display, which includes the laser mark; and
      providing the first navigational graphic on the visual display, the first navigational graphic overlaid on a portion of the second image data associated with the point of interest.

9. The method of claim 8 further comprising:
   determining a location of the first position in the reference frame; and
   determining a location of the second position in the reference frame, where the location of the first position and the location of the second position are determined using a total station with a prism pole.

10. The method of claim 8 further comprising:
    determining a location of the first position in the reference frame; and determining a location of the second position in the reference frame, where the location of the first position and the location of the second position are determined using a global navigation satellite system (GNSS) receiver.

11. The method of claim 8 wherein the visual display is disposed on a handheld data collector.

12. The method of claim 8 wherein the first imaging device and the second imaging device are integrated with a handheld data collector.

13. The method of claim 8 wherein performing the fine position guidance procedure further comprises providing a second navigational graphic on the visual display, the second navigational graphic overlaid on a portion of the second image data associated with the second position.

14. The method of claim 8 wherein:
the surveying pole has a contact point configured to be placed on the ground, and
the second imaging device is coupled to the surveying pole at a position that is closer to the contact point than the first imaging device.

15. The method of claim 8 wherein the surveying pole has a contact point configured to be placed on the ground, the second imaging device being coupled to the surveying pole at a position that is closer to the contact point than the first imaging device and arranged such that an optical axis of the second imaging device is substantially aligned with the contact point.

16. The method of claim 8 wherein the first imaging device and the second imaging device are each integrated with a receiver and coupled to a top of a surveying pole.

17. The method of claim 8 wherein performing the fine position guidance procedure includes adjusting an X-Y position of the second imaging device using a precision adjustment system.

* * * * *